US006985445B1

(12) United States Patent  (10) Patent No.: US 6,985,445 B1
Hao et al.  (45) Date of Patent: Jan. 10, 2006

(54) GENERATION OF TEST SUITES FOR INTEROPERABILITY OF REACTIVE COMMUNICATION SYSTEMS

(75) Inventors: Ruibing Hao, Scotch Plains, NJ (US); David Lee, Warren, NJ (US); Rakesh Kumar Sinha, Manville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/495,036

(22) Filed: Jan. 31, 2000

(51) Int. Cl.
*H04L 12/26* (2006.01)
(52) U.S. Cl. .................... 370/242; 370/241; 370/248; 370/249; 370/250; 370/252; 379/10.01; 379/27.04; 455/67.4; 714/715
(58) Field of Classification Search ............ 370/241, 370/242–245, 247–253, 252, 236, 255; 379/10.01, 379/27.04; 455/67.4; 714/715
See application file for complete search history.

(56) References Cited

U.S. PATENT DOCUMENTS

| | | | | |
|---|---|---|---|---|
| 5,623,499 A | * | 4/1997 | Ko et al. .................... | 714/724 |
| 6,292,909 B1 | * | 9/2001 | Hare ....................... | 379/10.01 |
| 6,373,822 B1 | * | 4/2002 | Raj et al. ................... | 370/252 |
| 6,466,548 B1 | * | 10/2002 | Fitzgerald .................. | 370/249 |
| 6,600,720 B1 | * | 7/2003 | Gvozdanovic ............... | 370/230 |

FOREIGN PATENT DOCUMENTS

EP  421652 A2 *  4/1991

OTHER PUBLICATIONS

A. V. Aho, et al, An Optimization Technique for Protocol Conformance Test Generation Based on UIO Sequences and Rural Chinese Postman Tours, IEEE Transactions on Communications, v. 39 (Nov. 1991) at pp. 1604-1615.

A. V. Aho, et al, Design and Analysis of Computer Algorithms, Addison-Wesley (1974) at pp. 209-222.

Sungwong, Kang and Myungchul Kim, Interoperability Test Suite Derivation for Symmetric Communication Protocols, Formal Description Techniques and Protocol Specification, Testing and Verification. Forte X/PSTV XVII'97. IFIP TC6 WG6.1 Joint Description Techniques for Distributed Systems and Communicaiton Protocols (forte x) and, pp. 57-72, XP001120045, 1997, London, UK, Chapman & Hall, UK ISBN: 0-412-82060-9 * p. 59, paragraph 7—p. 60, paragraph 3 * p. 64, paragraph 4—p. 66, paragrapgh 1 * figures 1,4.

Griffeth N et al: "Interoperability Testing of VOIP Systems" GLOBECOM '00—IEEE. Global Telecommunications Conference. Conference Record (Cat. No. 00CH37137), Proceedings of Global Telecommunications Conference San Francisco, CA, USA, Nov. 27-Dec. 2000. , pp. 1565-1570 vol. 3, XP002220073 2000, Piscataway, NJ, USA, IEEE, USA ISBN: 0 7803-6451-1* whole document.

(Continued)

*Primary Examiner*—Huy D. Vu
*Assistant Examiner*—Justin M. Philpott

(57) ABSTRACT

A method of generating a set of test sequences for evaluating interoperability of a number of interconnected communication systems with respect to a desired mode of communication between a first end user and a second end user. A number of operational states that are required of the communication systems to implement the desired mode of operation between the two end users is determined, wherein each state pertains to a first operation of a first gateway system associated with the first end user and a corresponding second operation of a second gateway system associated with the second end user. The interconnected communication systems are tested by causing the systems to perform specified transitions between pairs of at least some of the operational states.

7 Claims, 21 Drawing Sheets

OTHER PUBLICATIONS

Griffeth N et al: "Integrated System Interoperability Testing with Applications to VOIP" Formal Methods for Distributed System Development. Forte/PSTV 2000. IFIP TC6 WG6.1 Joint International Conference on Formal Description Techniques for Distributed Systems and Communication Protocols (Forte XIII) and Protocol Specification, Testing AN, pp. 69-84, XP001119758 2000, Norwell, MA, USA, Kluwer Academic Publishers, USA ISBN: 0-7923-7968-3 *the whole document.

Basapur V K et al: "Conformance Testing in the Telecommunications Industry" IEEE International Conference on Communications, 1990. ICC '90, vol. 4, 1990, pp. 1399-1403, XP010002698 *p. 1400, col. 2, paragraph 5—p. 1401, col. 1, paragraph 4.

European Search Report, Nov. 29, 2002.

* cited by examiner

*FIG. 2*

| *FIG. 2A* | *FIG. 2B* |
|---|---|
| *FIG. 2C* | *FIG. 2D* |

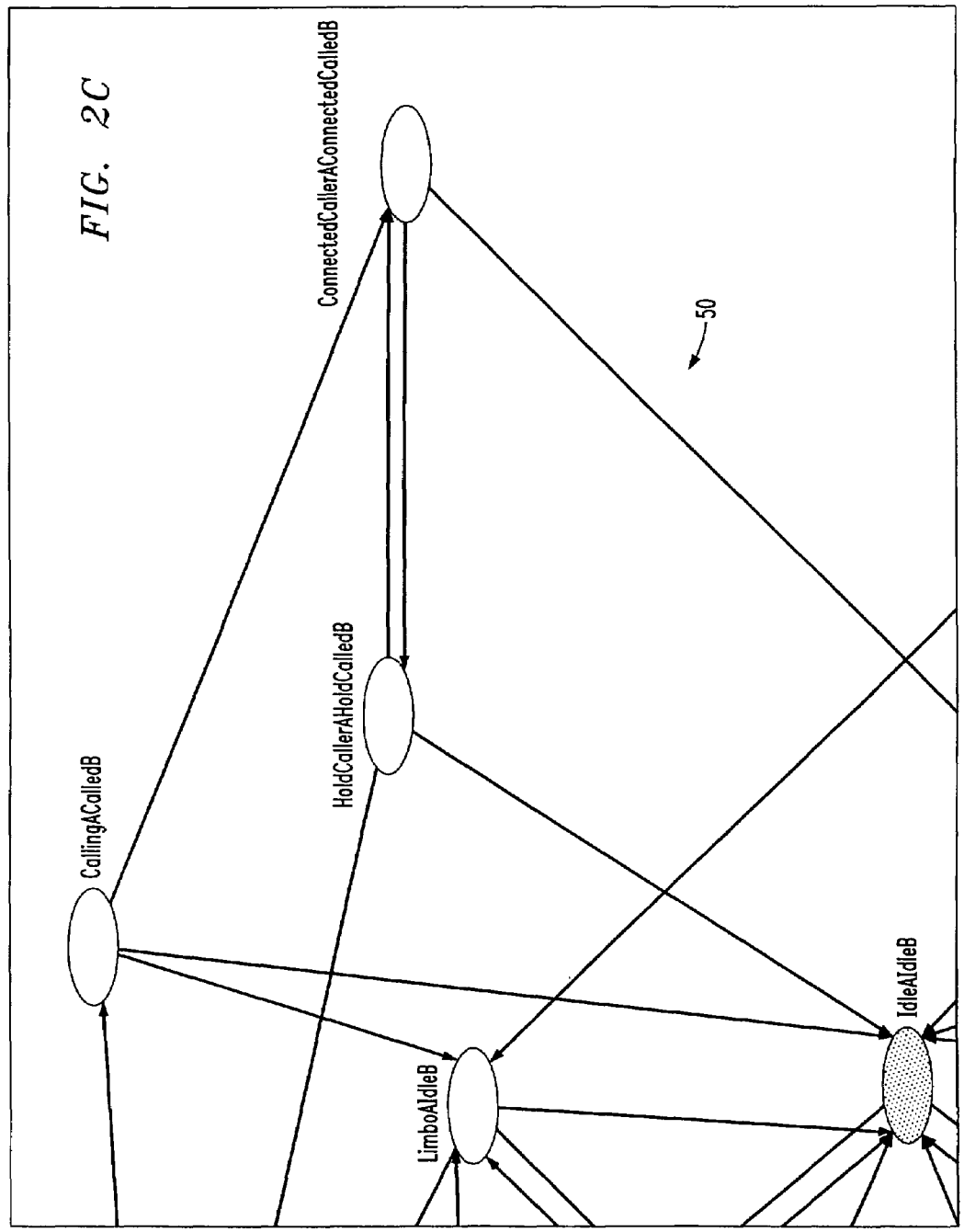

FIG. 3

```
gui efsm
  states { 21
    1.  CallingACalledB
    2.  DialingADialingB
    3.  IdleABusyB
    4.  CalledACallingB
    5.  BusyABusyB
    6.  DialingALimboB
    7.  BusyADialingB
    8.  BusyAIdleB
    9.  BusyALimboB
    10. LimboADialingB
    11. ConnectedCalledAConnectedCallerB
    12. LimboABusyB
    13. IdleADialingB
    14. LimboAIdleB
    15. DialingABusyB
    16. HoldCalledAHoldCallerB
    17. HoldCallerAHoldCalledB
    18. DialingAIdleB
    19. IdleALimboB
    20. ConnectedCallerAConnectedCalledB
    21. IdleAIdleB
  }
``` i = input
o = output
p = predicate
a = action

```
start {
  IdleAIdleB boolean term=false;
  boolean IdleA=true;
  boolean IdleB=true;
  boolean DialingA=false;
  boolean DialingB=false;

} transitions { 68
  1.  BusyADialingB BusyAIdleB {
        i { {On-hook B} }
        o { {} }
        p { true }
        a { { DialingB=false; IdleB=true } }
      }
  2.  IdleADialingB DialingADialingB {
        i { {Off-hook A} }
        o { {DialTone A} }
        p { true }
        a { {IdleA=false; DialingA=true} }
      }
  3.  BusyADialingB IdleADialingB {
        i { {On-hook A} }
        o { {} }
        p { true }
        a { { IdleA=true } }
      }
  4.  IdleABusyB IdleAIdleB {
        i { {On-hook B} }
        o { {} }
        p { true }
        a { {term=true;IdleB=true} }
      }
```

FIG. 4

```
}
5. HoldCallerAHoldCalledB IdleAIdleB {
     i { {On-hook A} }
     o { {} }
     p { true }
     a { {term=true;IdleA=true;IdleB=true} }
   }
6. IdleALimboB IdleADialingB {
     i { {Timeout B} }
     o { {DialTone B} }
     p { true }
     a { { DialingB=true } }
   }
7. BusyADialingB BusyABusyB {
     i { {Dial B A} }
     o { {LineBusyTone B} }
     p { true }
     a { { DialingB=false } }
   }
8. HoldCalledAHoldCallerB IdleAIdleB {
     i { {On-hook B} }
     o { {} }
     p { true }
     a { {term=true;IdleB=true;IdleA=true} }
   }
9. DialingAIdleB DialingADialingB {
     i { {Off-hook B} }
     o { {DialTone B} }
     p { true }
     a { { IdleB=false; DialingB=true } }
   }
10. IdleADialingB IdleAIdleB {
      i { {On-hook B} }
      o { {} }
      p { true }
      a { {term=true;IdleB=true;DialingB=false} }
```

```
   }
11. BusyABusyB BusyAIdleB {
      i { {On-hook B} }
      o { {} }
      p { true }
      a { { IdleB=true } }
    }
12. DialingADialingB BusyADialingB {
      i { {Dial A B} }
      o { {LineBusyTone A} }
      p { true }
      a { DialingA=false }
    }
13. IdleAIdleB IdleADialingB {
      i { {Off-hook B} }
      o { {DialTone B} }
      p { !term }
      a { {IdleB=false; DialingB=true} }
    }
14. HoldCalledAHoldCallerB IdleADialingB {
      i { {Timeout AB} }
      o { {DialToneB} }
      p { true }
      a { { IdleA=true; DialingB=true } }
    }
15. IdleABusyB DialingABusyB {
      i { {Off-hook A} }
      o { {DialTone A} }
      p { true }
      a { { IdleA=false; DialingA=true } }
    }
16. CallingACalledB ConnectedCallerAConnectedCalledB {
      i { {Off-hook B} }
      o { {} }
      p { true }
      a { {} }
```

FIG. 5

```
    }
17. DialingADialingB DialingABusyB {
        i { {Dial B A} }
        o { {LineBusyTone B} }
        p { true }
        a { { DialingB=false } }
    }
18. CalledACallingB IdleALimboB {
        i { {Timeout AB} }
        o { {} }
        p { true }
        a { { IdleA=true } }
    }
19. ConnectedCallerAConnectedCalledB IdleALimboB {
        i { {On-hook A} }
        o { {} }
        p { true }
        a { { IdleA=true } }
    }
20. ConnectedCallerAConnectedCalledB HoldCallerAHoldCalledB {
        i { {On-hook B} }
        o { {} }
        p { true }
        a { {} }
    }
21. IdleAIdleB DialingAIdleB {
        i { {Off-hook A} }
        o { {DialTone A} }
        p { !term }
        a { {IdleA=false; DialingA=true} }
    }
22. DialingABusyB BusyABusyB {
        i { {Dial A B} }
        o { {LineBusyTone A} }
        p { true }
        a { { DialingA=false } }
```

```
23. IdleALimboB IdleAIdleB {
        i { {On-hook B} }
        o { {} }
        p { true }
        a { {term=true;IdleB=true} }
    }
24. LimboAIdleB IdleAIdleB {
        i { {On-hook A} }
        o { {} }
        p { true }
        a { {term=true;IdleA=true} }
    }
25. HoldCalledAHoldCallerB ConnectedCalledAConnectedCallerB {
        i { {Off-hook A} }
        o { {} }
        p { true }
        a { {} }
```

*FIG. 6*

```
}
26. DialingABusyB IdleABusyB {
      i { {On-hook A} }
      o { {} }
      p { true }
      a { { DialingA=false; IdleA=true } }
    }
27. DialingABusyB DialingAIdleB {
      i { {On-hook B} }
      o { {} }
      p { true }
      a { { IdleB=true } }
    }
28. HoldCallerAHoldCalledB DialingAIdleB {
      i { {Timeout AB} }
      o { {DialTone A} }
      p { true }
      a { { DialingA=true; IdleB=true } }
    }
29. DialingAIdleB CallingACalledB {
      i { {Dial A B} }
      o { {AudibleRinging A,Ringing B} }
      p { true }
      a { {DialingA=false; IdleB=false} }
    }
30. IdleADialingB CalledACallingB {
      i { {Dial B A} }
      o { {AudibleRinging B,Ringing A} }
      p { true }
      a { { IdleA=false; DialingB=false } }
    }
31. BusyABusyB IdleABusyB {
      i { {On-hook A} }
      o { {} }
      p { true }
      a { { IdleA=true } }
```

```
}
32. CalledACallingB IdleAIdleB {
      i { {On-hook B} }
      o { {} }
      p { true }
      a { {term=true;IdleA=true;IdleB=true} }
    }
33. ConnectedCalledAConnectedCallerB HoldCalledAHoldCallerB {
      i { {On-hook A} }
      o { {} }
      p { true }
      a { {} }
    }
34. BusyAIdleB BusyADialingB {
      i { {Off-hook B} }
      o { {DialTone B} }
      p { true }
      a { { IdleB=false; DialingB=true } }
    }
35. LimboAIdleB DialingAIdleB {
      i { {Timeout A} }
      o { {DialToneA} }
      p { true }
      a { { DialingA = true; } }
    }
36. IdleALimboB DialingALimboB {
      i { {Off-hook A} }
      o { {DialTone A} }
      p { true }
      a { {IdleA=false;DialingA=true} }
    }
37. LimboAIdleB LimboADialingB {
      i { {Off-hook B} }
      o { {DialTone B} }
      p { true }
      a { {IdleB=false;DialingB=true} }
```

FIG. 7

```
38. DialingALimboB IdleALimboB {
      i { {On-hook A} }
      o { {} }
      p { true }
      a { {IdleA=true;DialingA=false} }
    }
39. BusyALimboB IdleALimboB {
      i { {On-hook A} }
      o { {} }
      p { true }
      a { IdleA=true }
    }
40. LimboABusyB IdleABusyB {
      i { {On-hook A} }
      o { {} }
      p { true }
      a { IdleA=true }
    }
41. LimboADialingB IdleADialingB {
      i { {On-hook A} }
      o { {} }
      p { true }
      a { IdleA=true }
    }
42. DialingALimboB DialingAIdleB {
      i { {On-hook B} }
      o { {} }
      p { true }
      a { IdleB=true }
    }
43. DialingAIdleB IdleAIdleB {
      i { {On-hook A} }
      o { {} }
      p { true }
      a { {term=true;IdleA=true;DialingA=false} }
    }
44. BusyALimboB BusyAIdleB {
      i { {On-hook B} }
      o { {} }
      p { true }
      a { IdleB=true }
    }
45. BusyAIdleB IdleAIdleB {
      i { {On-hook A} }
      o { {} }
      p { true }
      a { {term=true;IdleA=true} }
    }
46. LimboADialingB LimboAIdleB {
      i { {On-hook B} }
      o { {} }
      p { true }
      a { {DialingB=false;IdleB=true} }
    }
47. LimboABusyB LimboAIdleB {
      i { {On-hook B} }
      o { {} }
      p { true }
      a { IdleB=true }
    }
48. CalledACallingB ConnectedCalledAConnectedCallerB {
      i { {Off-hook A} }
      o { {} }
      p { true }
      a { {} }
    }
49. DialingALimboB BusyALimboB {
      i { {Dial A B} }
      o { {LineBusyTone A} }
      p { true }
      a { DialingA=false }
    }
```

FIG. 8

50. DialingADialingB IdleADialingB {
    i { {On-hook A} }
    o { {} }
    p { true }
    a { {IdleA=true; DialingA=false} }
}

51. LimboADialingB LimboABusyB {
    i { {Dial B A} }
    o { {LineBusyTone B} }
    p { true }
    a { DialingB=false }
}

52. CallingACalledB LimboAIdleB {
    i { {Timeout AB} }
    o { {} }
    p { true }
    a { { IdleB=true; } }
}

53. BusyAIdleB DialingAIdleB {
    i { {Timeout A} }
    o { {DialTone A} }
    p { true }
    a { DialingA=true }
}

54. DialingADialingB DialingAIdleB {
    i { {On-hook B} }
    o { {} }
    p { true }
    a { { DialingB=false; IdleB=true } }
}

55. BusyADialingB DialingADialingB {
    i { {Timeout A} }
    o { {DialTone A} }
    p { true }
    a { DialingA=true }
}

56. ConnectedCalledAConnectedCallerB LimboAIdleB {
    i { {On-hook B} }
    o { {} }
    p { true }
    a { { IdleB=true } }
}

57. BusyALimboB DialingALimboB {
    i { {Timeout A} }
    o { {DialTone A} }
    p { true }
    a { DialingA=true }
}

58. HoldCallerAHoldCalledB ConnectedCallerAConnectedCalledB {
    i { {Off-hook B} }
    o { {} }
    p { true }
    a { {} }
}

59. BusyABusyB DialingABusyB {
    i { {Timeout A} }
    o { {DialTone A} }
    p { true }
    a { DialingA=true }
}

60. CallingACalledB IdleAIdleB {
    i { {Onhook A} }
    o { {} }
    p { true }
    a { {term=true;IdleA=true;IdleB=true} }
}

61. LimboADialingB DialingADialingB {
    i { {Timeout A} }
    o { {DialTone A} }
    p { true }
    a { DialingA=true }
}

FIG. 9

```
    }
62. LimboABusyB DialingABusyB {
       i { {Timeout A} }
       o { {DialTone A} }
       p { true }
       a { DialingA=true }
    }
63. IdleABusyB IdleADialingB {
       i { {Timeout B} }
       o { {DialTone B} }
       p { true }
       a { DialingB=true }
    }
64. DialingABusyB DialingADialingB {
       i { {Timeout B} }
       o { {DialTone B} }
       p { true }
       a { DialingB=true }
    }
65. DialingALimboB DialingADialingB {
       i { {Timeout B} }
       o { {DialTone B} }
       p { true }
       a { DialingB=true }
    }
66. BusyABusyB BusyADialingB {
       i { {Timeout B} }
       o { {DialTone B} }
       p { true }
       a { DialingB=true }
    }
67. BusyALimboB BusyADialingB {
       i { {Timeout B} }
       o { {DialTone B} }
       p { true }
       a { DialingB=true }
```

```
    }
68. LimboABusyB LimboADialingB {
       i { {Timeout B} }
       o { {DialTone B} }
       p { true }
       a { DialingB=true }
    }
}
```

1 GENERATE ALL ACYCLIC PATHS

1a. COLLAPSE STRONGLY CONNECTED COMPONENTS INTO A SINGLE NODE

1 GENERATE ALL ACYCLIC PATHS

1b DETERMINE ALL PATHS IN DAG:

S1, S2, SCC1, S6
S1, SCC1, S6

FIG. 15

3 COMBINE THE PATHS AND THE CYCLES

S1, S2, S4, S6
S1, S3, S4, S6

+

S3, S4, S5, S3
S3, S4, S5, S7, S3

=

S1, S2, S4, S5, S3, S4, S6
S1, S2, S4, S5, S7, S3, S4, S6
S1, S3, S4, S5, S3, S4, S6
S1, S3, S4, S5, S7, S3, S4, S6

GENERATION OF TEST SUITES FOR INTEROPERABILITY OF REACTIVE COMMUNICATION SYSTEMS

BACKGROUND OF THE INVENTION

1. Field of the Invention

This invention relates to a method of generating a set of test sequences to confirm proper operation of interconnected communication systems.

2. Discussion of the Known Art

Generation of test sequences to determine whether or not a given communication system conforms to a specification or design requirement, is common practice. Automated test equipment available on the market is usually rented or leased by a system operator to test a system for proper operation when necessary. Such equipment is typically configured to perform a number of key tests in accordance with a program written specifically for the system.

It is believed that Internet protocol (IP) will play a large, if not dominant, role in future public telephony networks. Such networks are expected to handle not only voice, but video and other information and data as well. It is therefore important that existing data-centric and public switched telephone networks (PSTNs) be capable of operation when connected with one another through so-called "gateways". The ability of such networks or systems to operate properly when inter-connected is typically referred to as system "interoperability".

With respect to providing voice calls over an IP network ("Voice over IP" or "VoIP"), the first VoIP systems provided voice communications over a local area network (LAN) for end-users seated at personal computers. This proved unsatisfactory for several reasons. For example, voice quality was poor due to a "best-effort" standard for data packet delivery in the LAN environment. Also, there was no way to direct a voice call to a user connected to a PSTN, thus limiting the number of possible calls. And, a called end-user PC might not be connected to the network when the call was placed.

Because some providers believed IP telephony might circumvent long distance user rates due to the absence of tariffs on local Internet access, local user access gateways to PSTNs were created in each locality to be served, with a private Internet providing a long-distance backbone for voice calls. LEC's became interested in a similar strategy, but instead of using a gateway to connect local lines to an IP network, gateways were used to connect their central offices to an IP network, thus replacing a circuit-switched network backbone with an IP network. Finally, corporations maintaining large data networks became interested in combining their voice and data networks by running Voice over IP.

In view of the above, the existing diversity of VoIP implementations results in diverse communications systems that may not be able to interoperate when connected together. In order for these existing communication systems to remain effective, they must be able to interwork with the PSTN and with other VoIP products.

The Standards

Three important Internet telephone standards now exist. Initially, Standard H. 323 for Internet Telephony reflected the LAN bias of earlier Internet telephony systems. Subsequent standards address use of packet voice over wide-area networks and interwork with the PSTN.

Standard H.323 version 2 is a current dominant standard for commercial products. A second standard, Session Initiation Protocol (SIP), is a proposed standard of the Internet Engineering Task Force. A third standard, Media Gateway Control Protocol (MGCP), has also been proposed to provide interworking between Internet telephone and the PSTN.

The H.323 Standard is both an architecture and a standard for Voice over IP. It is an umbrella standard, specifying a collection of standards to be used by the components of the architecture which divides required functionality among gatekeepers, gateways, multipoint control units (MCUs), and endpoints.

Specifically, endpoints are the initial creators and ultimate recipients of information streams. They need not comply with any part of the H.323 protocol, but if they do not, they must communicate with the network through a gateway that does comply with the protocol. An endpoint that complies with H.323 is called an H.323 terminal.

An H.323 gateway provides communication between an H.323 network and a non-H.323 device or network. It may also provide communication with a second H.323 network.

An H.323 gatekeeper handles address translations, for example, between telephone numbers and IP addresses, and controls access to the network. A gatekeeper controls admission to a zone. Gateways, MCU's, and H.323 terminals must register with a gatekeeper, if one is present in their zone, and obtains permission to join a call. Optionally, call signaling may also go through the gatekeeper. There is no gatekeeper-to-gatekeeper standard, so that communication between multiple zones must be managed in an ad hoc fashion.

A multipoint control unit provides conferencing capabilities in an H.323 network. It includes a multipoint controller, and (optionally), one or more multipoint processors. The multipoint controller handles signaling that determines who participates in a conference, and what information streams they send and receive. The multipoint processors provide centralized processing of information streams (audio, video, or data) from various parties to a conference. The processing can be mixing, switching, or anything supporting a specific conference connection.

An H.323 terminal or gateway uses a Registration, Admission, and Status (RAS) channel defined in the standard to register with a gatekeeper, to locate other gateways and terminals, and to request permission to start or join a call. It may also route the call signaling through the gatekeeper. The call signaling protocol is a Q.931 subset, also defined in Standard H.225.0.

The actual media connections in a call and their types, are negotiated directly between gateways and/or endpoints using Standard H.245. Once the endpoints agree, transport connections are also set up using the H.245 standard. Transport connections can use any of a number of standards. For audio, Standard G.711 for uncompressed voice is required, but not always implemented. Other, optional audio Standards are G.723.1 and G.729. For video, Standard H.261 is required; and Standard H.263 is optional. For data, Standard T.120 is required.

Because of the many choices available when building an H.323-compliant system, and since requirements for communication between zones are not specified, it is quite likely that H.323-compliant systems manufactured by different vendors will not interoperate. Further, the number of configurations to be tested to determine system interoperability, becomes relatively large.

The Session Initiation Protocol (SIP) identifies the following functionality which is needed to set up multimedia conferences:

User Location: Determination of the end system to be used for communication. A location server provides the user location information, in response to a request from a SIP server or proxy. Users may also register their locations with a SIP server, using a REGISTER method.

User Availability: Determination of the willingness of a called party to engage in communications. An end-user wishing to set up a call with another end-user, or to add it to a conference, invokes an INVITE method on the user's SIP server. Possible responses include "Success" and "Redirection".

User Capabilities: Determination of the media and media parameters to be used. To determine what media and media parameters will be used for a call, the calling system invokes an OPTION method on the SIP server of the called party. This is an inquiry as to what are the capabilities of the called party.

Call Setup: "Ringing", establishment of call parameters at both called and calling party.

Inoperability of SIP implementations is less problematic than that of H.323 implementations. Interoperation of SIP user agents and servers with H.323 networks remains problematic, however. A type 7R/E Programmable Feature Server, available from Lucent Technologies Inc., provides protocol interworking through device servers that interface to specific protocols.

The Media Gateway Control Protocol (MGCP) is a combination of two earlier standards, IP Device Control (IPDC) and SGCP (Simple Gateway Control Protocol SGCP). The protocol provides for media gateways that convert signals from TDM to packet, and back, and for call agents that control the behavior of media gateways. This is a master/slave arrangement, with the call agent as the master and the gateway as the slave. Synchronization between various call agents involved in a call must be handled by other means.

MGCP is thus used as an internal protocol within a distributed system that appears as a single VoIP gateway to an external H.323 network. A call agent may signal to other call agents using the RAS and H.225.0 protocols. This provides means to interwork H.323 networks with IP networks.

Accordingly, there is currently a need to verify that when two communication systems are connected for interworking, such as to provide, e.g., VoIP service, the connected system behavior will be as expected from interactions with one or more components of the integrated system under test. Specifically, there is a need for a method in the form of, e.g., portable software, that will generate test sequences which, if successfully implemented, will assure both branch and full path coverages for the connected systems.

SUMMARY OF THE INVENTION

According to the invention, a method of generating a set of test sequences for evaluating interoperability of a number of interconnected communication systems, with respect to a desired mode of communication between a first end user and a second end user, includes determining a number of operational states that are required of the systems to implement the desired mode of operation between the end users, wherein each operational state pertains to a first operation of a first gateway system associated with the first end user, and a corresponding second operation of a second gateway system associated with the second end user. The interconnected communication systems are tested by causing the systems to perform specified transitions between pairs of at least some of the operational states.

For a better understanding of the invention, reference is made to the following description taken in conjunction with the accompanying drawing and the appended claims.

BRIEF DESCRIPTION OF THE DRAWING

In the drawing:

FIG. 2 is a guide showing relative positions of FIGS. 2A, 2B, 2C and 2D;

FIGS. 2A to 2D together form a typical finite state machine (FSM) representation of the interconnected model in FIG. 1.

FIGS. 3–9 show various states, and transitions between the states in the FSM of FIG. 2;

FIG. 15 represents a third step toward determining a set of tests for system interoperability;

DETAILED DESCRIPTION OF THE INVENTION

Interoperability testing is concerned only with failures that may occur when two different systems are connected or coupled with one another to interoperate. It is assumed that two systems operate correctly when running independently, or when coupled to other identical systems. Potential interoperation failures to be checked are those due to interoperation between two independently designed or developed systems.

Figure 1:
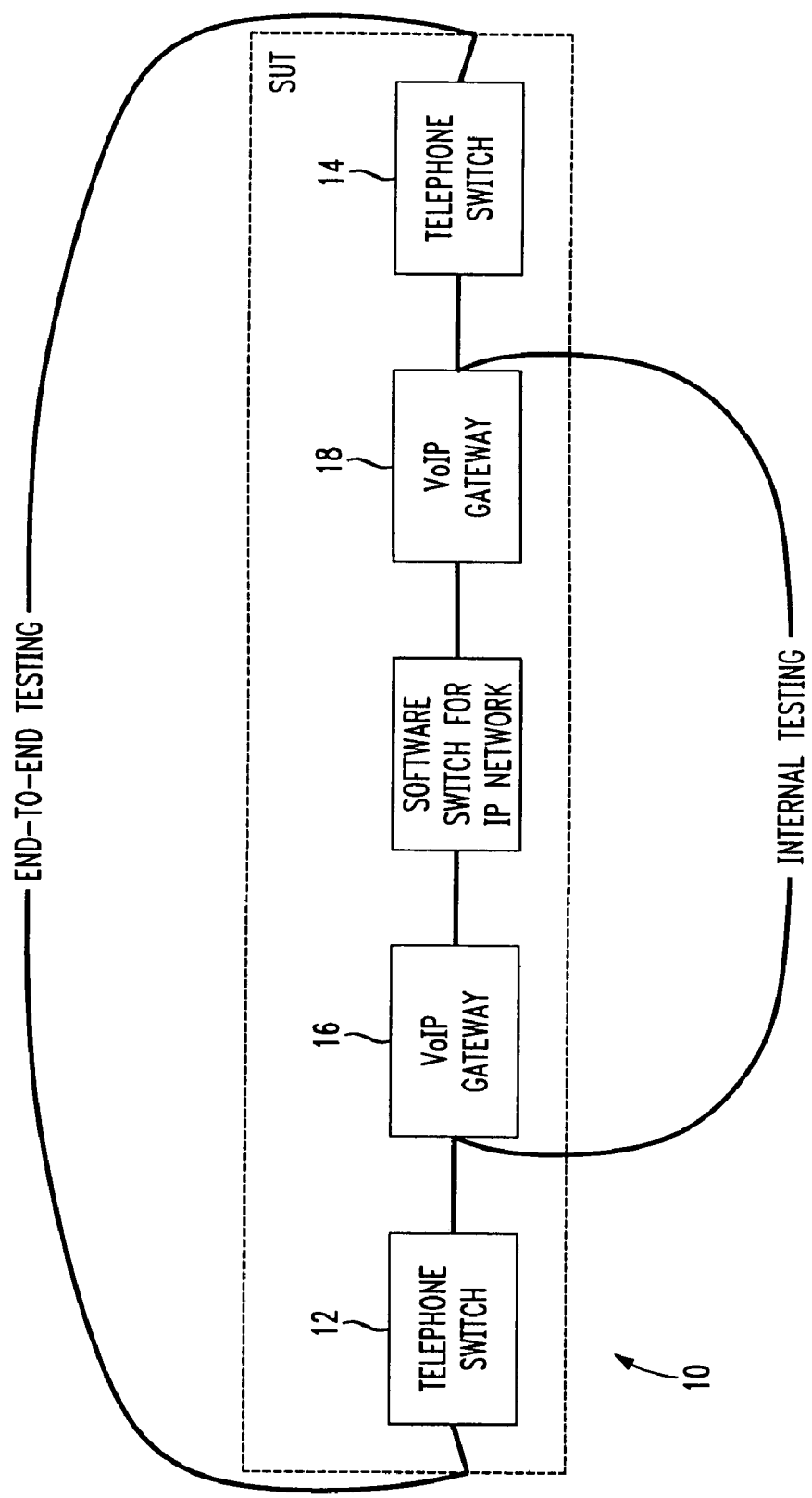
FIG. 1 is a block diagram of a model showing voice end-users connected to one another by an IP Network through associated gateways.
Figure 2A:
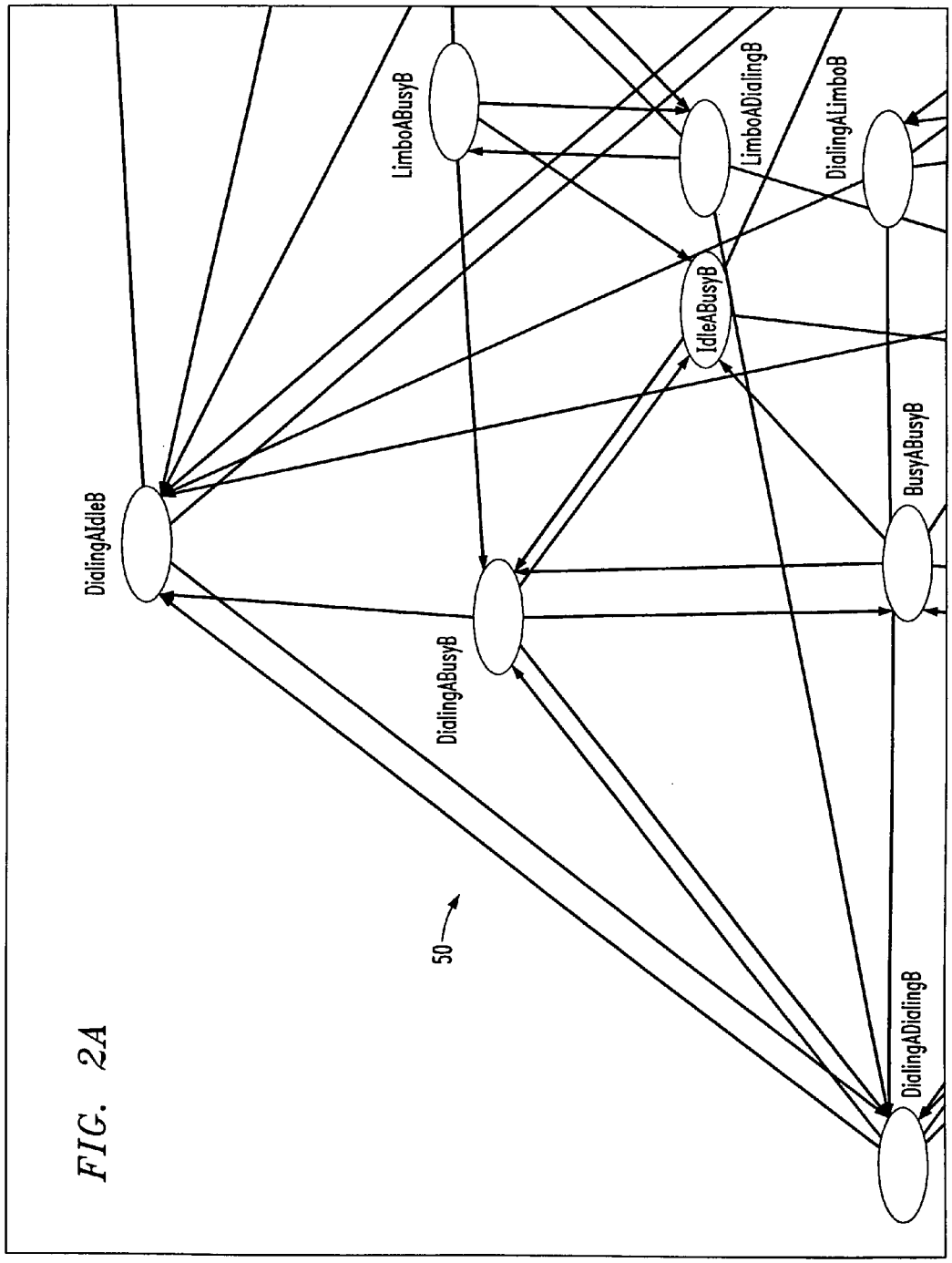
Figure 2B:
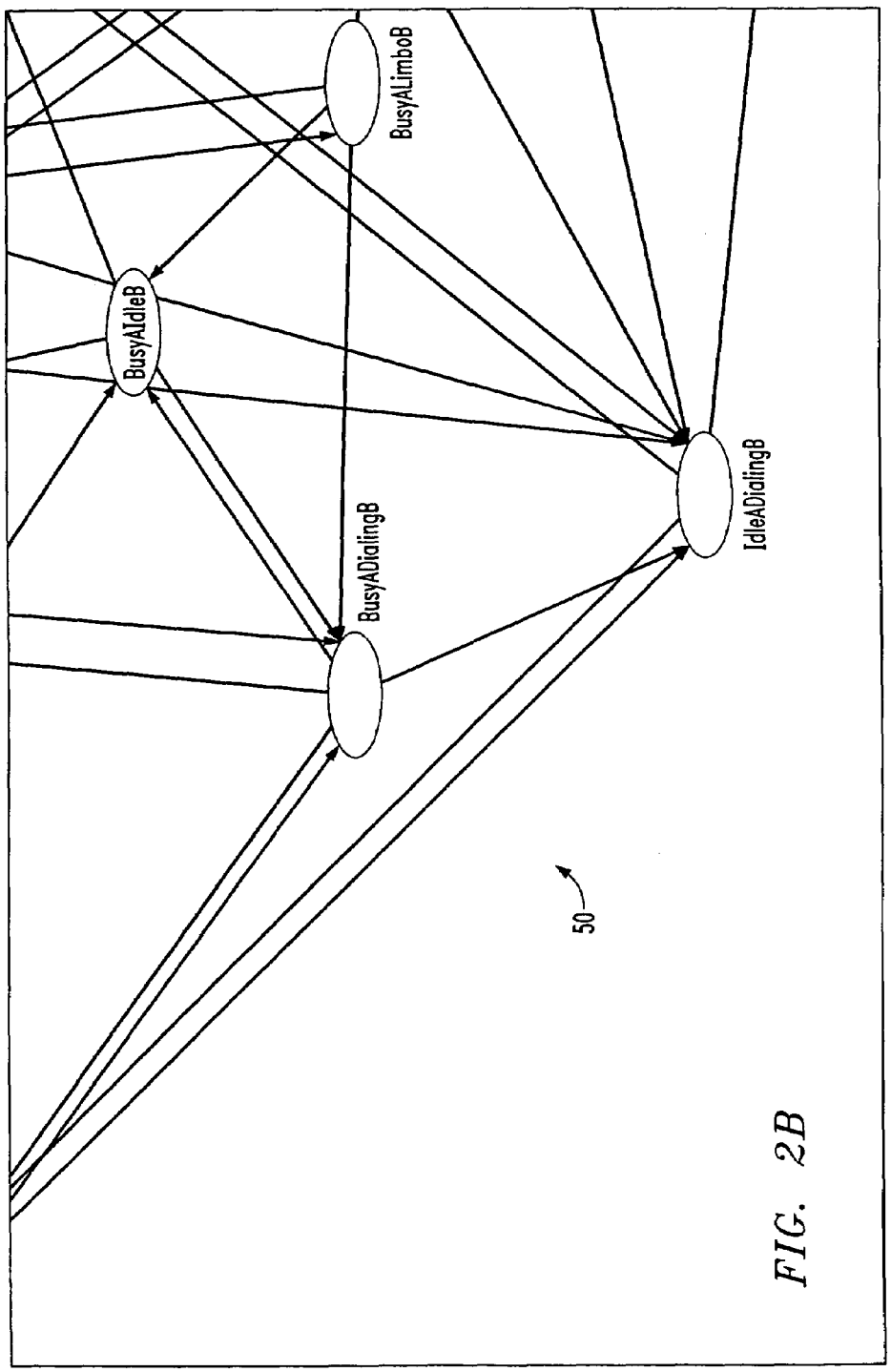
Figure 2D:
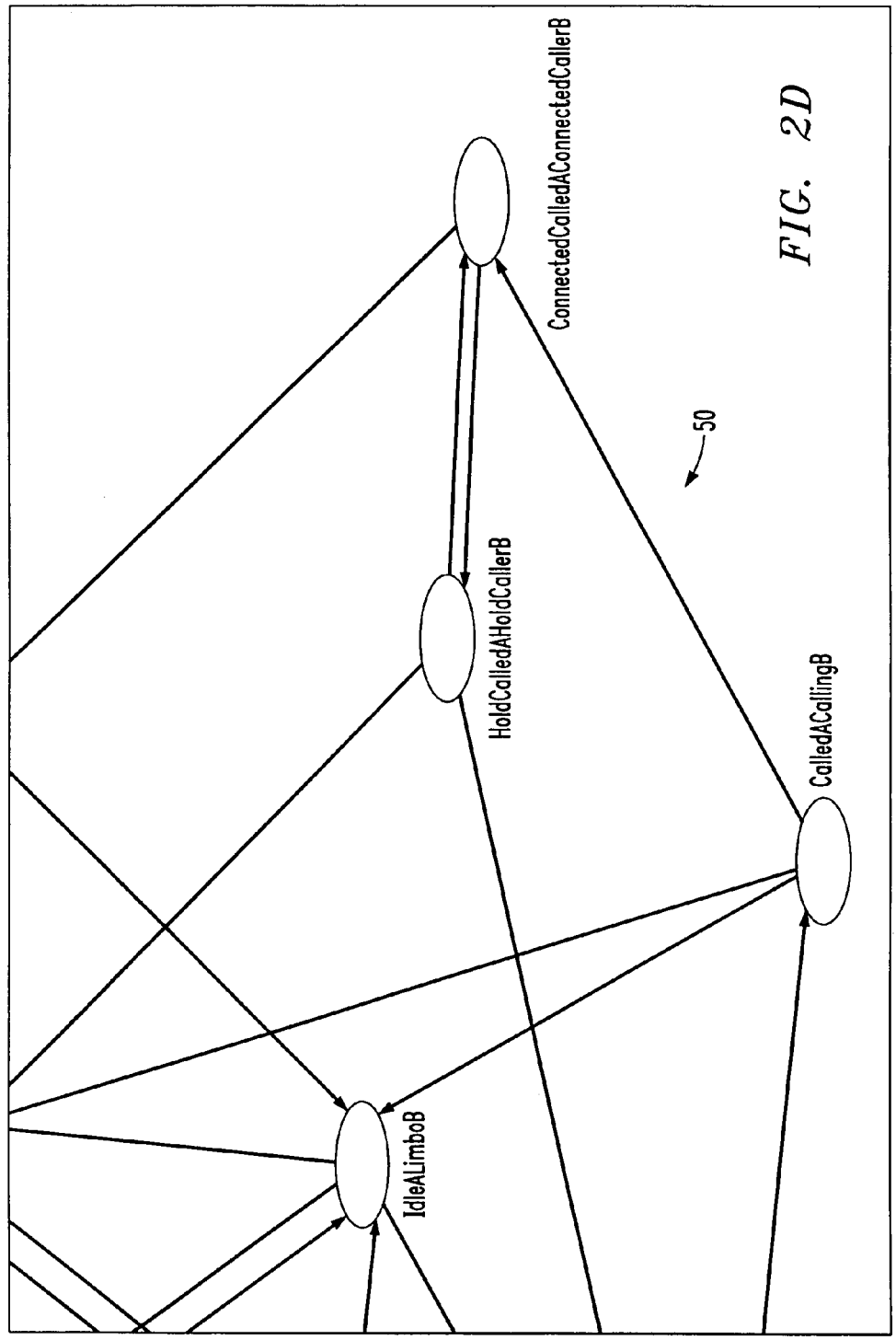
Figure 10:
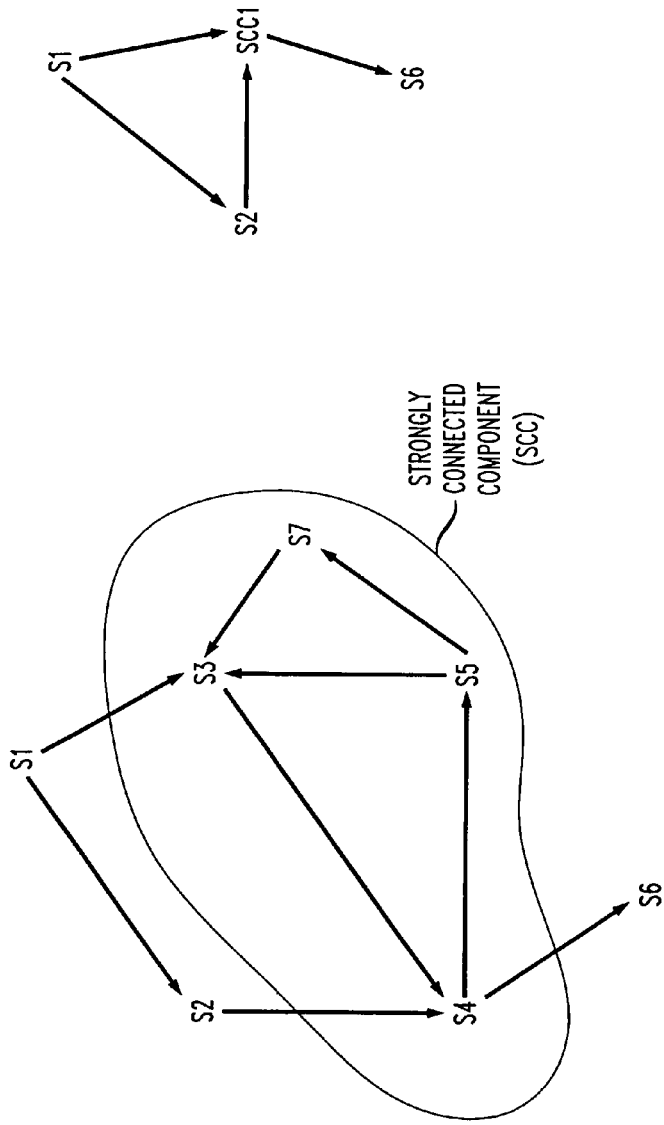
FIGS. 10–13 together represent a first step toward determining which transitions are to be tested for interoperability of interconnected communication systems.
Figure 11:
Figure 12:
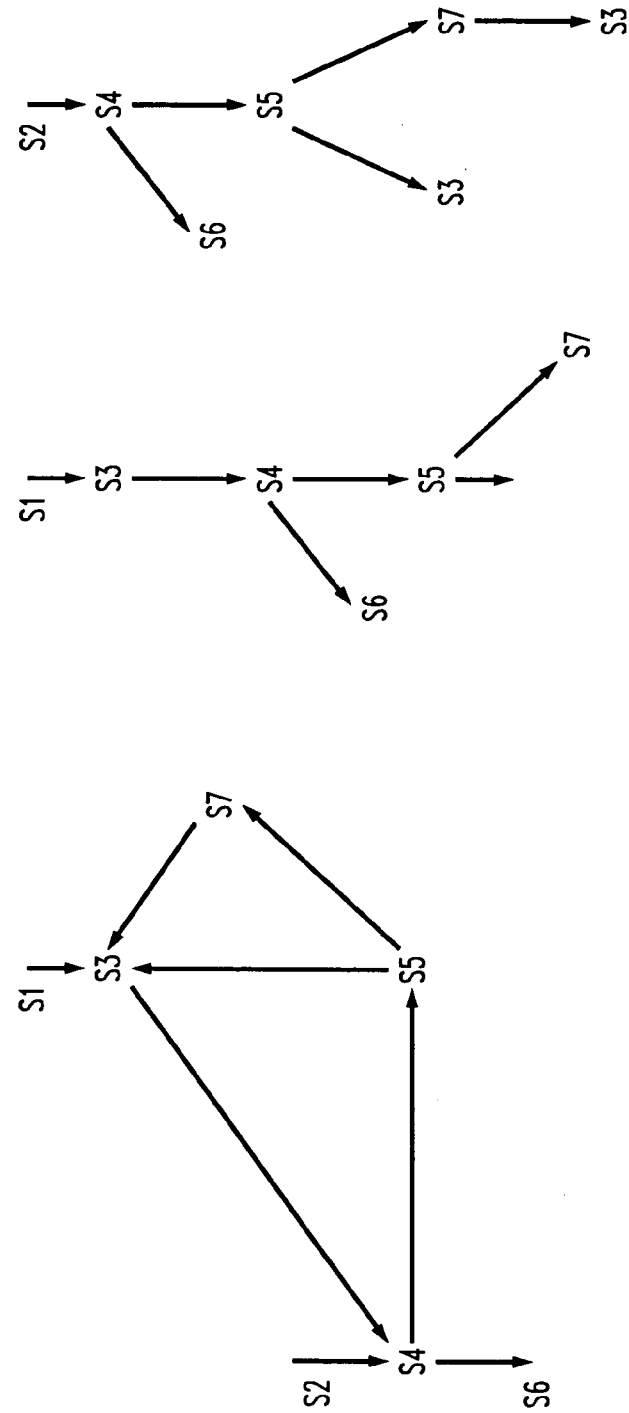
Figure 13:
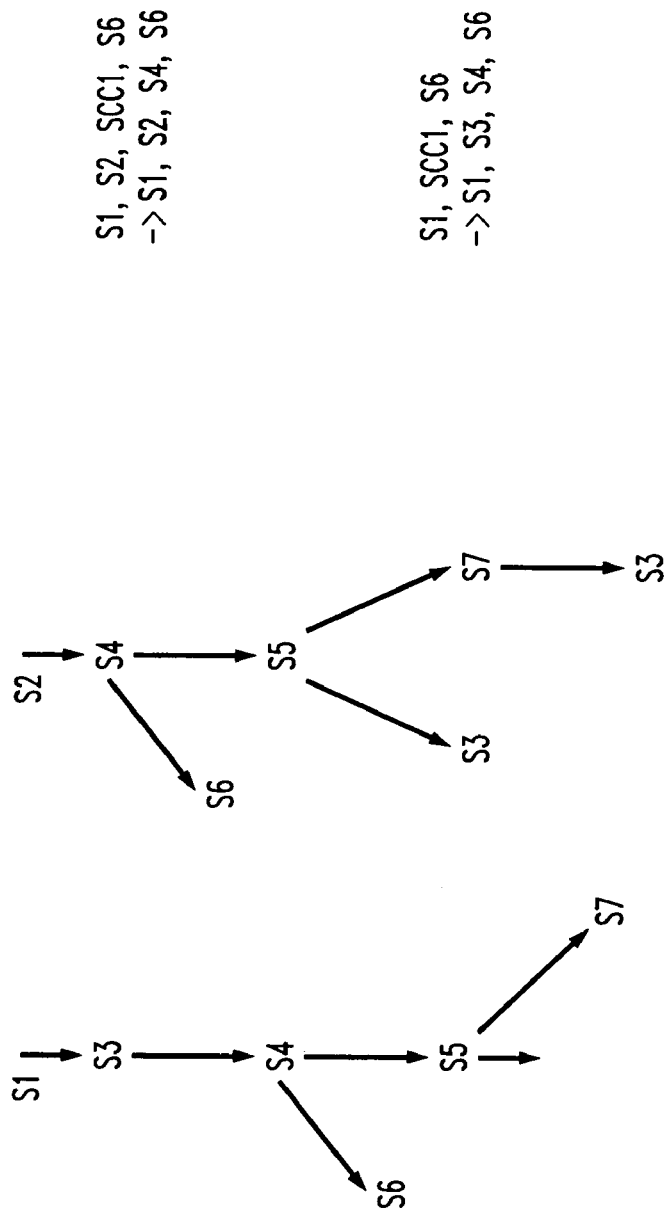

A model 10 for a general configuration of interoperating communication systems, such as Voice over Ip systems, is shown in FIG. 1. The figure shows two end-users 12, 14 that want to communicate. Each user can access the systems through a corresponding gateway 16, 18. The two gateways 16, 18 communicate with each other using a defined protocol to decide whether and how to start the communication between the end-users 12, 14. The protocol takes the gateways 16, 18 through various states as they negotiate concerning the desired communication. The end users 12, 14 may wish to communicate by voice, or to exchange other information in either analog or digital form.

It is important to note that interoperability errors, if any, will be introduced only when the gateways 16, 18 actually communicate with one another about a call. Local activities involved in the protocol, e.g., obtaining information from either end-user 12 or 14 can be ignored. Interactions or "transitions" that can be ignored for interoperability purposes are referred to as "white", and all other transitions are referred to as "black". A white transition is purely local, that is, it reads the state of only one gateway 16 or 18, and writes the same state. A black transition involves both gateways 16 and 18 because the transition reads the states of both of the gateways, or reads the state of one and writes the state of the other.

For example, an "off-hook" transition from an idle state of a user's telephone to a dialing state of the same user's telephone is white, because the transition involves only an originating gateway and its associated end user. A "dial" transition from "dialing" of a calling user's telephone to "ringing" of a called user's telephone is black, because the states change in both gateways 16 and 18. Similarly, an off-hook transition that connects the call changes states in both gateways 16, 18 from ringing to connected. Accordingly, test cases that correspond only to sequences involving black edges are generated, i.e., those sequences that occur while a call is under negotiation between the two gateways 16 and 18.

Expected system behavior is modeled in accordance with a finite state machine (FSM) 50, typical vertices (nodes) and edges of which are shown in FIGS. 2A to 2D. The FSM 50 of FIGS. 2A to 2D has 21 states (nodes) and a total of 68 transitions between the states, as defined in FIGS. 3–9. A transition from a first state to a second state is identified by locating the two ordered states on the first line of one of the 68 transitions in FIGS. 3–9. Ideally, all possible execution sequences or "scenarios" should be covered. Because the transition diagram of the FSM 50 is a directed graph, covering all possible execution sequences requires that all branches and all possible paths be tested. Criteria for ruling out "redundant" scenarios are given further below, however.

Generally, the transition diagram will contain cycles, and, therefore, will have an infinite number of distinct paths. Therefore, the test generation process includes the following three steps:

Test Generation Process

Step 1: Generate all possible acyclic paths, i.e., paths without repeated vertices. See FIGS. 10 to 13.

Figure 14:
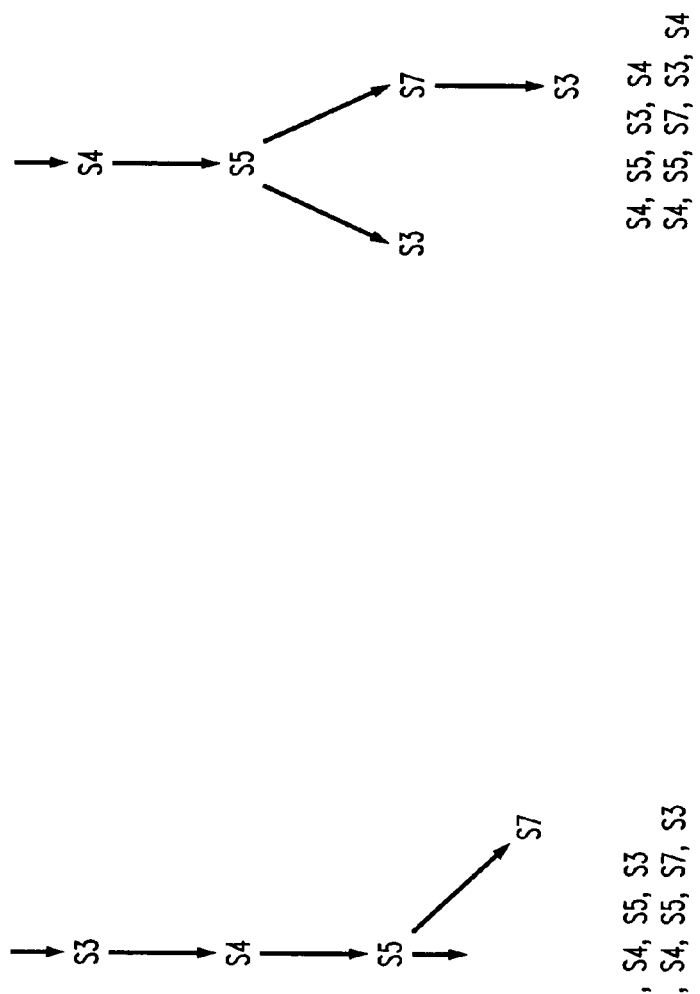
FIG. 14 represents a second step toward determining a set of tests for system interoperability.

Step 2: Generate all possible simple cycles, i.e., cycles that do not contain any smaller cycles. See FIG. 14; and Step 3: "Combine" the paths (from Step 1) and cycles (from Step 2) to generate a final set of paths. See FIG. 15.

The number of paths and cycles generated in the first two steps is finite. Various criteria for removing redundant acyclic paths and redundant simple cycles are given later below.

With respect to Steps 1 and 2, all strongly connected components (SCC) of the transition graph are first found. This has two advantages; (a) we know that any cycle is completely contained inside a SCC, so, Step 2 can be performed by looking at each SCC in turn and finding all simple cycles within the SCC, and (b) we can "shrink" each SCC into a node and obtain a Directed Acyclic Graph (DAG), i.e., a graph without any cycles. This translates into a two-phase process for Step 1. First, generate all acyclic paths on the resulting DAG, and then replace each SCC on any given path with a set of acyclic paths within the SCC.

The goal of the "combine" process in Step 3 is to generate a finite number of paths that cover all scenarios of interest. This is done first by including all the acyclic paths. Then additional cyclic paths are generated as follows.

For each acyclic path P, find all the cycles that share a node with P. Let these cycles be $C_1, C_2, \ldots C_k$, and let $v_1$, $1 \leq i \leq k$, be a node common to $C_i$ and P. Then generate a new (cyclic) path by replacing node $v_i$ in P with cycle $C_i$.

Next-Transition-Tree

A simple data structure, next-transition-tree, which is convenient for Steps 1 and 2, is now described. See FIG. 12.

The data structure can be defined for any graph but, in the present application, the graph is always a SCC.

For any node v (e.g., S1), net-transition-tree (v) stores all acyclic paths from v to other vertices in its SCC. The tree has v as its root, and its height is equal to the number of nodes in the SCC containing v. Children of v are all the nodes in its SCC that have a direct edge from v. In general, the children of any node (e.g., S1–S7) are all the nodes in its SCC that have a direct edge from node u. Note that a node may appear multiple times in this tree. That is, each node has a label where the labels are not necessarily unique. The root node has label v. A node labeled u has as many children as the outdegree of u (number of edges leaving u) in its SCC, and these children are labeled with the corresponding nodes in the SCC.

For ease of illustration, assume that a separate next-transition-tree is maintained for each node in the graph. The actual implementation may have many shared pieces among next-transition-trees belonging to the same SCC.

Generating all Simple Cycles

All simple cycles containing any node v are generated as follows: Consider all paths in next-transition-tree (v) that contain another (than root) instance of node v. In any such path, the path segment from the root to the first (closed from root) occurrence of v corresponds to a cycle containing v. This path segment will correspond to a "simple" cycle if it does not contain any repeated nodes. Therefore, the process includes finding all such path segments, and all simple cycles containing v are generated. As mentioned, this is a simplified description of an actual implementation, which should not maintain any paths with repeated nodes in the next-transition-tree.

One way to generate all simple cycles in a SCC is to consider its vertices in some order: $v_1, V_2, \ldots, V_k$. Generate all simple cycles containing the node $v_1$. Then generate all simple cycles containing the node $v_2$ that don't contain node $v_1$. This can be accomplished by modifying the above procedure so that path segments containing the node $v_1$ are ignored. All simple cycles containing the node $V_3$ that don't contain nodes $v_1$ or $v_2$, are then generated, and so on.

Generating all Acyclic Paths

As mentioned earlier, all the strongly connected components (SCC) of the transition graph must be found. A "component graph" where each node represents a SCC, and an edge from node u to node v represents an edge (in the original transition graph) from a node belonging to u's SCC to a node belonging to v's SCC, is then constructed. This component graph is a Directed Acyclic Graph (DAG), i.e., a graph without any cycles. See A. V. Aho, et al., The Design and Analysis of Computer Algorithms (Addison-Wesley 1974), all relevant portions of which are incorporated by reference. All acyclic paths in the DAG are first generated, and then each SCC on any given path is replaced with a set of acyclic paths within the SCC.

Redundancy

There are a finite number of distinct paths representing potential tests in a DAG. Not all of them need to be tested, however. Rather, a minimal number of tests, which collectively satisfy a coverage criterion for the connected systems and which do not contain any redundant tests, are desirably generated.

The tests must start from a "Start" state, so only those paths beginning from a source node which has no incoming transitions are considered first. The following redundancy criteria may then be applied.

(R1) Proper prefixes are redundant and may be ignored.

Redundancy criterion R1 implies that only those paths terminating at a sink node (a node without an outgoing transition) be considered. Any path not terminating at a sink node is a proper prefix of a path that has been extended to a sink node. Accordingly, only those paths that start from the source node and terminate at one of the sink nodes need to be generated.

The following procedure generates all source-to-sink paths in a DAG.

---

PATHS-IN-DAG

Input. a DAG G with one sources and multiple sinks.
Output. all source-sink paths in G.
1  topologically sort nodes in G: $s = v_0, v_1, \ldots, v_{n-1}$;
2  for $i = n - 1, \ldots, 0$
3      if $v_i$ is a sink node then
4          $p(v_i) = \{\Lambda\}$; /* a singleton set of empty path */
5      else
6          let outgoing edges from $v_i$ be: $\omega_i, \ldots, \omega_r$;
7          $p(v_i) = U_{j=1}^{r}(v_i, \omega_j)p(\omega_j)$;
8  return $p(v_0)$

---

The above procedure is bottom-up, starting from one of the sink nodes $t=v_{n-1}$. When processing a node $v_i$, we examine all of its outgoing edges $(v_i, w_j)$ where the paths from $w_j$ to sink nodes have been computed. At Line 7 above, we concatenate edge $(v_i, w_j)$ to each path computed at $w_j$ and collect it at node $v_i$. After processing the source node $s=v_0$, all of the paths which are irredundant and have complete coverage are obtained.

A topological sort takes time proportional to the number of edges. We charge to the examination and concatenation each edge, which is processed only once at Line 7, and the total cost is proportional to the total paths lengths.

Proposition 1. The procedure PATHS-IN-DAG constructs all source-sink paths. Its time and space requirement is linear in output, i.e., the total lengths of all the constructed tests.

Proposition 2. For machines with a reset to source s, the constructed test sequences are a checking sequence.

Generating all Acyclic Paths within a SCC

The generation of paths (i.e., tests) for DAGs where nodes can be SCC's has been discussed. For each edge connecting two SCC's on a path, the edge is replaced with an edge in the original graph. In general, it will be possible to replace an edge between SCC's with one of several possible edges in the original graph, and a separate path for each choice of replacement edge can be obtained.

Each SCC node is also replaced with a set of acyclic paths within the SCC. Assume the incoming and the outgoing edges to the SCC node are on nodes u and v of the SCC. The SCC node needs to be replaced with all possible acyclic paths from u to v in the SCC. These paths can be generated from next-transition-tree (u).

Replacing any SCC with all possible acyclic paths provides exhaustive coverage, but may generate a relatively large number of tests. In certain applications, it may not be necessary to cover the SCC's as thoroughly. Two options used in practice are as follows:

Chinese Postman Tour. For an SCC, each edge (transition) is tested at least once and the test sequence length is minimized. Such a path is called Chinese Postman Tour. See A. V. Aho, et al., An Optimization Technique for Protocol Conformance Test Generation Based on UIO Sequences and Rural Chinese Postman Tours, 39 IEEE Trans. on Communication, No. 11 (November 1991) at 1604–15, which is incorporated by reference.

Checking Sequence. A more thorough coverage is provided by a checking sequence that guarantees the structural isomorphism of the implementation and the specification machines. The length of such a test sequence will be longer than that of a Chinese Postman Tour.

The following procedure summarizes the steps in generating all possible tests:

---

TEST-GENERATION

Input. An EFSM with a designated source state
Output. Minimal set of tests providing full coverage
1   Construct an equivalent FSM and its transition diagram G
2   Find all SCC's of G.
3   For each SCC
4       for each node in the SCC
5           construct next-generation-tree
6   Shrink each SCC of G to obtain a DAG G'
7   Apply procedure PATHS-IN-DAG on G' to obtain all acyclic source-sink paths in G'
8   Replace each edge and node to obtain the set P of acyclic paths
9   Obtain the set C of all simple cycles
10  Combine the sets P and C to obtain the final set of tests

---

Additional Redundancy Criteria

The TEST-GENERATION procedure, above, provides exhaustive coverage. The number of tests generated may be enormous even for moderate sized systems, however.

As stated earlier, system interoperability errors may occur only when the system gateways actually "talk" to one another concerning a given call. Transitions are therefore labeled as either "white" to connote local activity, or as "black" if they involve both gateways. Thus, for interoperability test generation, white transitions need not be covered, and the following additional redundancy criteria become appropriate.

(R2) Remove all-white test sequences.

(R3) Let (u,v) be the last black edge in the test sequence. Then replace the path from the source node to node u with the shortest path between the source node and node u.

(R4) Let (u,v) be the first black edge in the test sequence. Then replace the path from node v to the sink node with the shortest path between node v and the sink node.

(R5) If there is a sequence of white edges in which each party separately reaches an idle state, terminate the sequence at the last black edge and then use a shortest path to the state "IdleA, IdleB" at the end of the sequence.

Criteria R2, R3 and R4, above, reflect that white transitions are not relevant for interoperability testing. Their only use is to connect relevant black transitions. For example, R3 states that the sequence of transitions before the first black transition is not relevant, so that part may be replaced with the shortest all-white sequence. Criterion R4 is a dual of R3. The last criterion R5 reflects that if both parties reach an "idle" state through a sequence of non-relevant transitions, then nothing concerning system interoperability will happen in the rest of the sequence.

The following procedure generates all acyclic paths satisfying these criteria:

COMPLETE COVERAGE

Input. transition graph G of a FSM.
Output. complete set of paths according to redundancy criteria R1–R5.
1   for each node v that has an outgoing black edge
2     if there is an all-white path from the source node to v then
3       add a super-edge from the source node to v;
4   delete all outgoing edges (not super-edges) from the source node;
5   for each node v that has an incoming black edge
6     if there is an all-white path from v to a sink node then
7       add a super-edge from v to this sink node;
8   delete all incoming edges (not super-edges) to the sink node;
9   generate all acyclic paths in the resulting graph by procedure PATHS-IN-DAG with the modification that no super-edge should follow or precede a white edge;
10  replace each super-edge with the shortest all-white path in the original graph;
11  process each path according to redundancy criterion R5;

Generating Test Sequences according to R1-R5

The above procedure COMPLETE-COVERAGE starts with a graph G and generates another graph G such that the set of source-sink paths in G' is the same as the set of source-sink paths in G, while satisfying criteria R2–R4. Lines 1–4 of COMPLETE-COVERAGE consider all possible black transitions that may be the first in any sequence, and add a marker 'super-edge' for the shortest all-white path from the source node. Line 9 ensures that a black transition follows a super-edge. The marker 'super-edge' is replaced on line 10 by the shortest all-white path. This handles redundancy criterion R3. Lines 5–8 perform an analogous function for sink nodes and the last black transitions in the sequence, reflecting redundancy criterion R4. Criterion R2 is satisfied because line 9 ensures there is at least one black transition. Instead of generating all paths and then processing them according to criterion R5 per line 11, an actual implementation may ensure that the incremental construction of all paths in procedure PATHS- IN-DAG is such that a path in violation of R5 is never generated.

Proposition 3. The procedure COMPLETE-COVERAGE constructs all acyclic paths-according to criteria R1–R5.

Generating a Smaller Set of Test Sequences

On most practical systems, we expect the above procedure COMPLETE-COVERAGE to generate a considerably smaller set of test sequences than the procedure TEST-GENERATION. But even such a smaller set may be too large for manual test execution, however. Accordingly, the following describes a set of more restrictive criteria for test generation, concentrating only on black transitions.

(R6) Generate acyclic paths having only black edges, except that the prefix from the source node, and the suffix to the sink node, are allowed to contain white edges.
(R7) Generate simple cycles having only black edges.

The following procedure ADEQUATE-COVERAGE generates a test-set according to R6 and R7.

Figure 16:
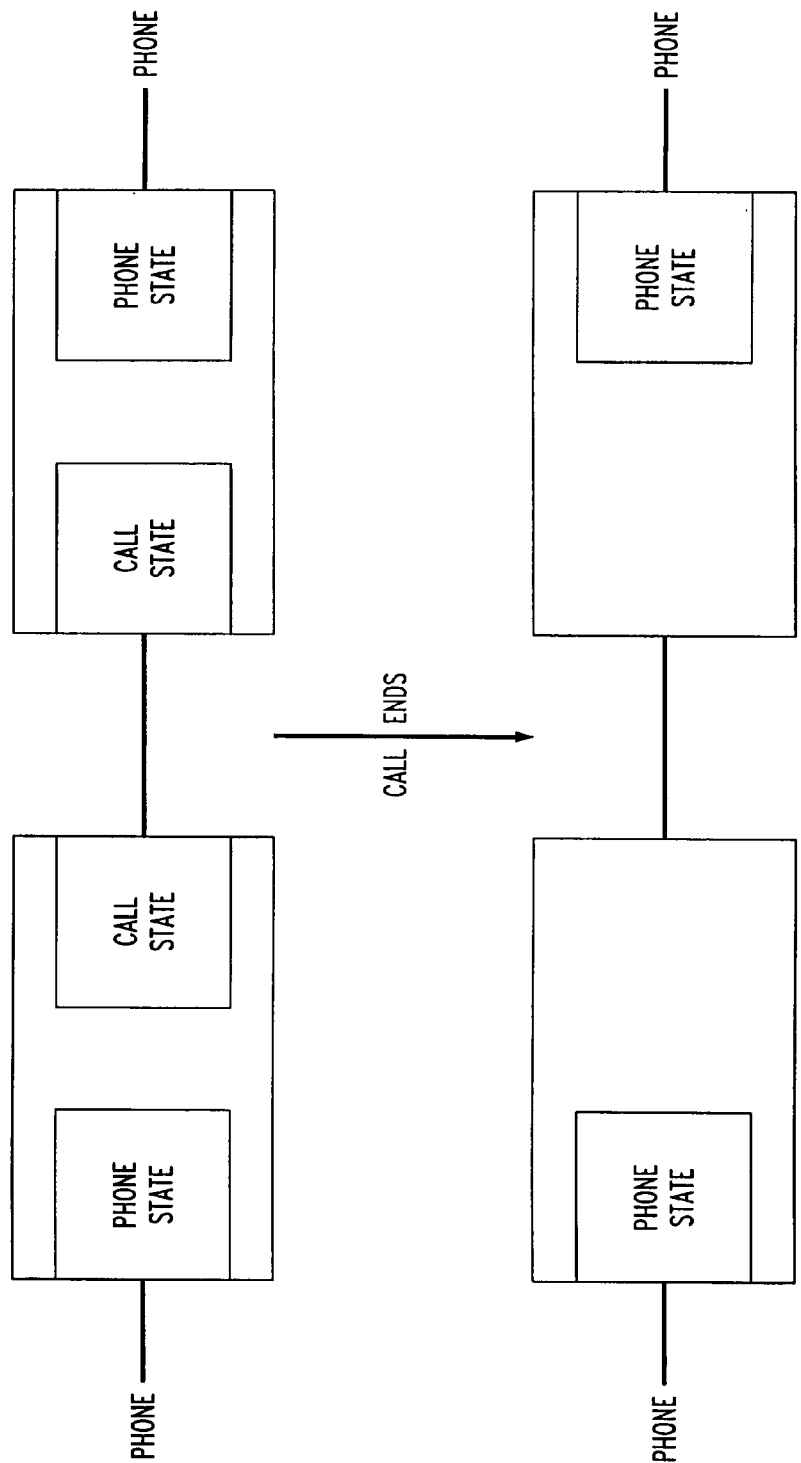
FIG. 16 is a block diagram representing criteria for a set of tests to ensure adequate coverage for interconnected communication systems.

Input, transition graph G of a FSM.
Output. test generation according to R6 and R7.
1   full coverage.
2   for each node v that has an outgoing black edge
3     if there is a path from the source node to v then
4       add super-edge from the source node to v;
5   for each node v that has an incoming black edge
6     if there is a path from v to a sink node then
7       add a super-edge from v to this sink node;

-continued 8   delete all white edges from the graph;
    /* the only remaining edges are super-edges or black edges */
9   generate all acyclic paths in the resulting graph;
10  replace each super-edge with the shortest path in the original graph;

The procedure ADEQUATE COVERAGE starts with a graph G, and transforms it into a graph G' such that the set of source-sink paths in G' is the same as the set of source-sink paths in G with criterion R6. The intuition of the procedure is to delete all white edges except those needed to reach black transitions from the source node, or from the black transitions to the sink nodes. Line 4 maintains a marker 'super-edge' for each source node to black transition path. On line 10, this marker is replaced with the shortest path. Lines 4–6 perform an analogous function for sink nodes. Criteria for adequate coverage are represented in FIG. 16.

Proposition 4. The procedure ADEQUATE-COVERAGE constructs all acyclic paths according to criterion R6.

If automated test execution is available, then the COMPETE-COVERAGE procedure is more desirable. If tests must be executed by hand, however, then the ADEQUATE-COVERAGE procedure will likely produce a manageable set of test sequences. Alternatively, one may always start with the ADEQUATE-COVERAGE procedure since it does apply to the most critical interoperability behavior. If the systems pass those tests generated by ADEQUATE-COVERAGE, one may obtain the broader coverage provided by the COMPLETE-COVERAGE procedure.

EXAMPLE

Figure 17:
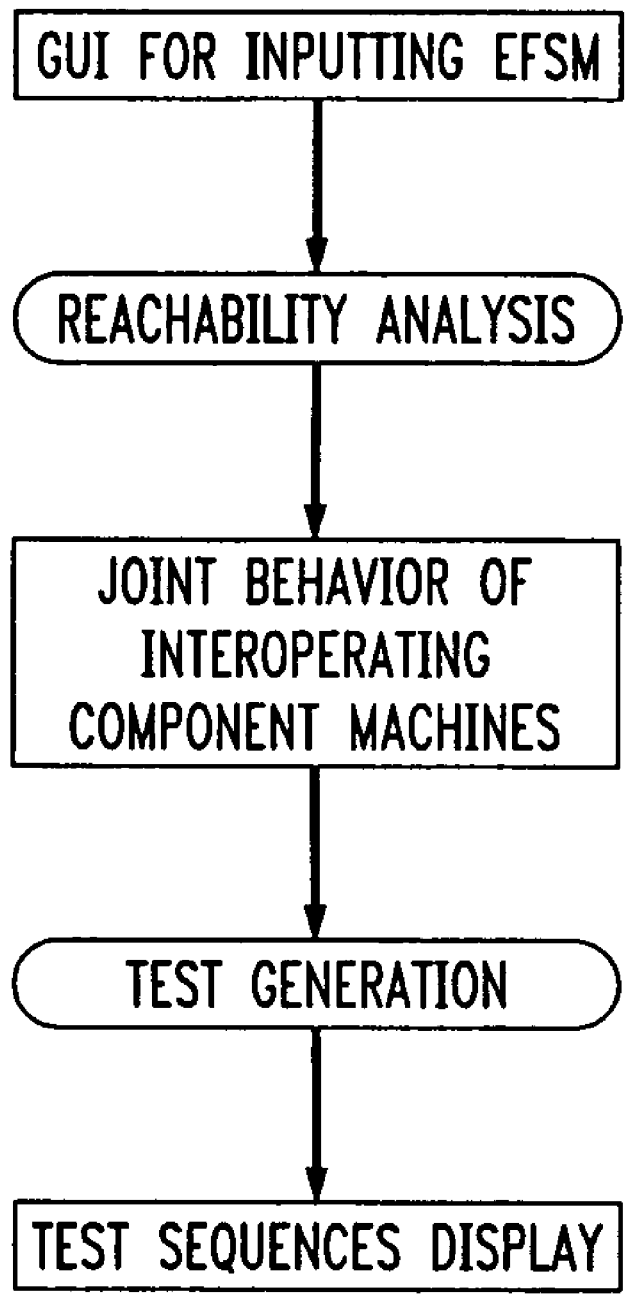
FIG. 17 is a diagram representing a software program that produces test sequences for interconnected communication systems.

A portable software tool referred to as Interoperability Testing Intelligent System (IT-IS) for automated interoperability test generation, was written in ANSI C and Tcl/Tk. The program includes a graphical user interface (GUI) for user input, and for displaying generated test sequences. The workflow of IT-IS is shown in FIG. 17.

The input to IT-IS is an extended FSM (EFSM) description of the composed system behavior. IT-IS first performs reachableness analysis to convert the EFSM into a FSM, e.g., FSM 50 in FIG. 2, and then uses different procedures on the FSM to generate the test sequences.

IT-IS was used to generate interoperability test cases for end-user VoIP testing. As shown in FIGS. 3–9, the FSM 50 has 21 states and 68 transitions.

Among the transitions, 24 are colored black, others are white. The shrunk DAG generated by IT-IS from the FSM 50 contains 3 SCC nodes, and only one of them has more than one state. The number of test sequences generated by applying the procedures described above, is shown in the following table.

| Procedure | Loop-Free Paths | Loops | Final Tests |
|---|---|---|---|
| TEST-GENERATION | 950 | 424 | 1752 |
| COMPLETE-COVERAGE | 508 | 424 | 908 |
| ADEQUATE-COVERAGE | 16 | 4 | 22 |

The final tests for either of the complete-coverage or the adequate-coverage procedures involve only black transitions.

Interoperability testing is indispensable for integration of reactive communication systems. The presently disclosed procedures are distinguishable over conventional conformance testing techniques in that the procedures focus on the system interfaces, and are not directed solely to individual system implementations or specifications.

While the foregoing description represents preferred embodiments of the invention, it will be obvious to those skilled in the art that various changes and modifications may be made, without departing from the spirit and scope of the invention pointed out by the following claims.

We claim:

1. A method of generating test sequences for evaluating the interoperability of communication systems connected through a first and second Voice-over-Internet Protocol (VoIP) gateway with respect to a desired mode of operation between the systems, the method comprising:

determining transitions that are required to implement the desired mode of operation, wherein each transition pertains to a first operation of the first VoIP gateway and a corresponding second operation of the second VoIP gateway;

said determining step further comprising, generating acyclic paths from a transition diagram representing possible transitions;

generating simple cycles from said transition diagram; and combining said generated paths and cycles to form a final set of paths representing said determined transitions; and testing each communication system by causing each system to perform the determined transitions.

2. The method of claim 1, including providing at least one of the communication systems in the form of an Internet protocol network.

3. The method of claim 1, including providing at least one of the communication systems in the form of a switched telephone network.

4. The method of claim 1, including selecting the desired mode of communication as voice communication.

5. The method of claim 1, including providing an Internet protocol (IP) network as one of the communication systems, coupling the first VoIP gateway system to the IP network, and coupling the second VoIP gateway system to the IP network.

6. The method of claim 5, including coupling a switched telephone network between the first and second VoIP gateway systems.

7. The method of claim 1, including eliminating from said testing step transitions concerning only the first VoIP gateway system, and transitions concerning only the second VoIP gateway system.

* * * * *

UNITED STATES PATENT AND TRADEMARK OFFICE
CERTIFICATE OF CORRECTION

PATENT NO. : 6,985,445 B1  Page 1 of 1
APPLICATION NO. : 09/495036
DATED : January 10, 2006
INVENTOR(S) : Hao et al.

It is certified that error appears in the above-identified patent and that said Letters Patent is hereby corrected as shown below:

On the title page: Item [75] Inventors, add --Nancy D. Griffeth--

Signed and Sealed this

Twenty-second Day of January, 2008

JON W. DUDAS
*Director of the United States Patent and Trademark Office*